UNITED STATES PATENT OFFICE.

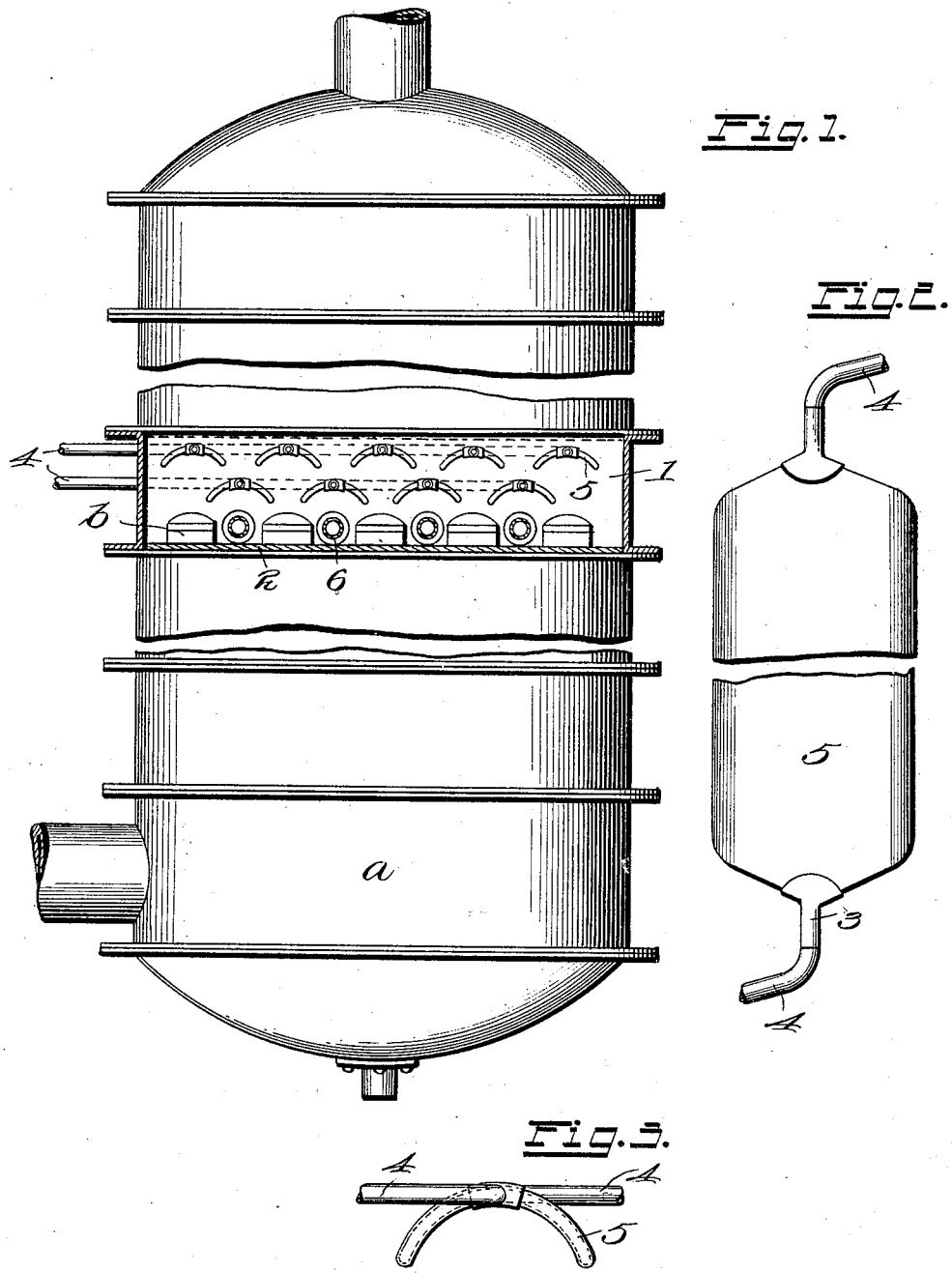

RENÉ VALLAT, OF PARIS, FRANCE, ASSIGNOR TO GUSTAVUS ADOLPHUS PFIZER, OF PARIS, FRANCE.

DISTILLING-COLUMN.

No. 903,636.     Specification of Letters Patent.     Patented Nov. 10, 1908.

Application filed April 1, 1907. Serial No. 365,839.

*To all whom it may concern:*

Be it known that I, RENÉ VALLAT, a citizen of the French Republic, and resident of Paris, France, have invented certain new and useful Improvements in Distilling-Columns, of which the following is a specification.

My invention relates to distilling columns to be used in distilling and rectifying alcohol, petroleum, etc.

The object of my invention is to provide special refrigerating and condensing means between the plates, which divide the column into compartments.

With this object in view, my invention consists in the construction and combinations of parts as hereinafter described and claimed.

In the accompanying drawings—Figure 1 is a side view, partly in section, of a column having my invention embodied therein. Fig. 2 is a top plan view of one of the hollow refrigerating boxes, and Fig. 3 is an end view of the same, showing a water pipe connected thereto.

*a* represents the base of the column which is divided into compartments 1 by a plurality of plates 2, through which tubes *b* of the usual construction pass. Passing through the shell are a series of cooling tubes 3 connected to pipes 4 so that water or air may be forced therethrough. The pipes 3 on the inside of the still are soldered to hollow boxes 4 of the peculiar shape shown in the drawing, that is to say, in cross section each one is composed of two parallel walls, each curved on the arc of a circle, having their ends united together as shown in Figs. 2 and 3, the whole forming a curved hollow box having two substantially parallel sides. These boxes are arranged staggered in relation to each other, as shown in Fig. 1. Between the tubes *b* are located straight cooling tubes 6. Owing to the shape of the boxes 4, a very large cooling surface is exposed to the vapors, and owing to the staggered relation of these boxes, very little of the vapor can escape upwardly without coming in contact with a cooling surface, the result being a most efficient refrigeration.

I claim:—

In a distilling column, the combination of a shell, plates dividing said shell into compartments, and cooling means in said shell, consisting of hollow boxes, each bent to form a portion of an annular cylinder and provided with inlet and outlet pipes, said boxes being arranged staggered relatively to each other, substantially as described.

In testimony whereof, I have hereunto set my hand in presence of two witnesses.

RENÉ VALLAT.

Witnesses:
  C. VAN KELSEN,
  GREGORY PHELAN.